United States Patent [19]

Kim

[11] Patent Number: 5,774,131
[45] Date of Patent: Jun. 30, 1998

[54] SOUND GENERATION AND DISPLAY CONTROL APPARATUS FOR PERSONAL DIGITAL ASSISTANT

[75] Inventor: Hong Joo Kim, Seoul, Rep. of Korea

[73] Assignee: LG Electronics Inc., Seoul, Rep. of Korea

[21] Appl. No.: 547,226

[22] Filed: Oct. 24, 1995

[30] Foreign Application Priority Data

Oct. 26, 1994 [KR] Rep. of Korea ................. 27483/1994

[51] Int. Cl.$^6$ ..................................... G06F 15/16
[52] U.S. Cl. ................... 345/503; 345/509; 364/400.01; 704/270
[58] Field of Search ................... 395/501–526, 395/762, 807, 2.09, 2.79; 345/113, 115, 185–187, 189, 203, 112, 154, 501–503, 507, 509, 512, 521; 364/514 A, 400.01; 704/200, 270, 272

[56] References Cited

U.S. PATENT DOCUMENTS

| 5,432,900 | 7/1995 | Rhodes et al. | 345/302 |
| 5,491,498 | 2/1996 | Koyama et al. | 345/521 |
| 5,537,608 | 7/1996 | Beatty et al. | 379/521 |
| 5,553,220 | 9/1996 | Keene | 345/520 |

Primary Examiner—Matthew M. Kim
Assistant Examiner—U. Chauhan

[57] ABSTRACT

An improved sound generation and display control apparatus for a personal digital assistant capable of improving the system thereof and a transmission performance for various kinds of display apparatuses and capable of editing an externally supplied video source and providing an overlay function, which includes a central processing unit for controlling the entire system so as to display stored data and to generate sound; a graphic and sound co-processor for processing graphic and sound data in accordance with a control of the central processing unit; a memory for storing the graphic and sound data processed by the graphic and sound co-processor and for storing system data; a direct memory access (DMA) controller for accessing the data stored in the memory in accordance with a DMA request; a bus arbitrator and memory controller for arbitrating an allocation of a system bus and for controlling an access to the memory and a refreshment of the memory; a sound generator for receiving the sound data outputted from the memory through the DMA controller and for generating a sound corresponding to the sound data applied thereto; and a display timing controller for receiving the display data outputted from the memory through the DMA controller and for processing the display data so as to display the data on a display member, thus providing a video overlay function and the capability of editing an externally applied video data, providing a single memory system, and enhancing the system operation performance.

19 Claims, 4 Drawing Sheets

SOUND GENERATION AND DISPLAY CONTROL APPARATUS FOR PERSONAL DIGITAL ASSISTANT

BACKGROUND OF THE INVENTION

1. Field of the Invention

The present invention relates to a sound generation and display control apparatus for a personal digital assistant, and in particular to an improved sound generation and display control apparatus for a personal digital assistant, capable of improving the system thereof and a transmission performance for various kinds of display apparatuses, editing an externally supplied video source, and having an overlay function.

2. Description of the Conventional Art

Referring to FIG. 1, a conventional sound generation and display control apparatus for a personal digital assistant includes a central processing unit 1 for controlling the entire system, a system memory 2 for storing system data being used in the central processing unit 1 and sound data outputted from the central processing unit 1, a memory controller 3 for controlling an access to the system memory 2 and a refreshment of the system memory 2, a sound generator 4 for receiving the sound data stored in the system memory 2 in accordance with a control of the central processing unit 1 and for generating a sound SD corresponding to the sound data applied thereto, a display memory 6 for storing the display data outputted from the central processing unit 1, and a display timing controller 5 for executing an arbitration function with respect to a data bus and a display memory bus (DMB) and for accessing the display memory 6 for refreshing the screen.

The operation of the conventional sound generation and display control apparatus for a personal digital assistant will now be explained with reference to FIG. 1.

To begin with, the central processing unit 1 transmits an address to the display timing controller 5 through an address bus. The display data of the display memory 6 corresponding to the address is transmitted through the display memory bus and the data bus by the display timing controller 5, and the central processing unit 1 reads the display data. In addition, the central processing unit 1 writes the display data on to the display memory 1 through the display timing controller 5. The display timing controller 5 arbitrates the allocations of the data bus and the display memory bus and accesses the refreshing data of the display memory 6 so as to refresh the screen on which the display data are displayed. In case that the display memory 6 is a DRAM, there is provided a logic so as to refresh the display memory 6.

Meanwhile, the system memory 2 includes a sound buffer region so as to store the sound data processed by the central processing unit 1. The sound generator 4 receives the sound data stored in the system memory 2 through a previously fixed input/output port in accordance with a control of the central processing unit 1 and the memory controller 3, and generates a sound SD corresponding to the sound data. The sound generator 4 processes the sound data to create a specific sound effect like an echo effect, and in case that the system memory 2 is a DRAM, the memory controller 3 includes a predetermined logic so as to refresh the system memory 2.

However, the conventional sound generation and display control apparatus has disadvantages in that since it additionally includes a display memory, there should be some logic such as a refreshing logic for a memory control, This disadvantageously requires more space for additional elements and results in higher power consumption. In addition, the conventional sound generation and display control apparatus for a personal digital assistant uses a suspended mode-like power management method so as to extend the life span of the battery adopted thereto. In such suspended mode-like power management method, since the power is supplied only to the power control logic and the system memory, it is disadvantageously necessary to move the data stored in the system memory to the display memory so as to resume the data stored in the system memory after copying the data of the display memory to the system memory. Moreover, it is difficult to provide a space as large as the display memory in the system memory at a personal digital assistant without using an additional memory apparatus.

SUMMARY OF THE INVENTION

Accordingly, it is an object of the present invention to provide a sound generation and display control apparatus for a personal digital assistant, which overcomes the problems encountered in conventional sound generation and display control apparatuses for a personal digital assistant.

It is another object of the present invention to provide an improved sound generation and display control apparatus for a personal digital assistant capable of improving system and transmission performances for various kinds of display apparatuses and of editing an externally supplied video source and having an overlay function.

To achieve the above and other objects, in accordance with a first embodiment of the present invention, there is provided a sound generation and display control apparatus for a personal digital assistant, which includes a central processing unit for controlling the entire system so as to display stored data and to generate sound; a graphic and sound co-processor for processing graphic and sound data in accordance with a control of the central processing unit; a memory for storing graphic and sound data processed by the graphic and sound co-processor and for storing system data; a DMA controller for accessing the data stored in the memory in accordance with a DMA request; a bus arbitrator and memory controller for arbitrating an allocation of a system bus and for controlling an access with respect to the memory and a refreshment of the memory; a sound generator for receiving the sound data outputted from the memory through the DMA controller and for generating a sound corresponding to the sound data applied thereto; and a display timing controller for receiving display data outputted from the memory through the DMA controller and for processing the display data so as to display the data on a display member.

To achieve the above and other objects, in accordance with a second embodiment of the present invention, there is provided a sound generation and display control apparatus for a personal digital assistant, which includes a central processing unit for controlling the entire system so as to display stored data and to generate sound; a graphic co-processor for processing graphic data in accordance with a control of the central processing unit; a memory for storing graphic and system data processed by the graphic co-processor; a bus arbitrator and memory controller for arbitrating an allocation of a system bus and for controlling an access with respect to the memory and a refreshment of the memory; a video decoder for decoding an externally applied video source in a format to be displayed on a display member; a video memory for storing data decoded by the video decoder;

a display timing controller for processing the data of the memory applied thereto through a system bus and for overlaying the data of the memory and the data outputted from the video memory and for displaying the data on the display member; and a DMA controller for accessing the data stored in the memory in accordance with a DMA request signal outputted from the display timing controller, transmitting the data to the display timing controller, reading the data in accordance with a control of the central processing unit, and for storing the data of the video memory in the memory. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
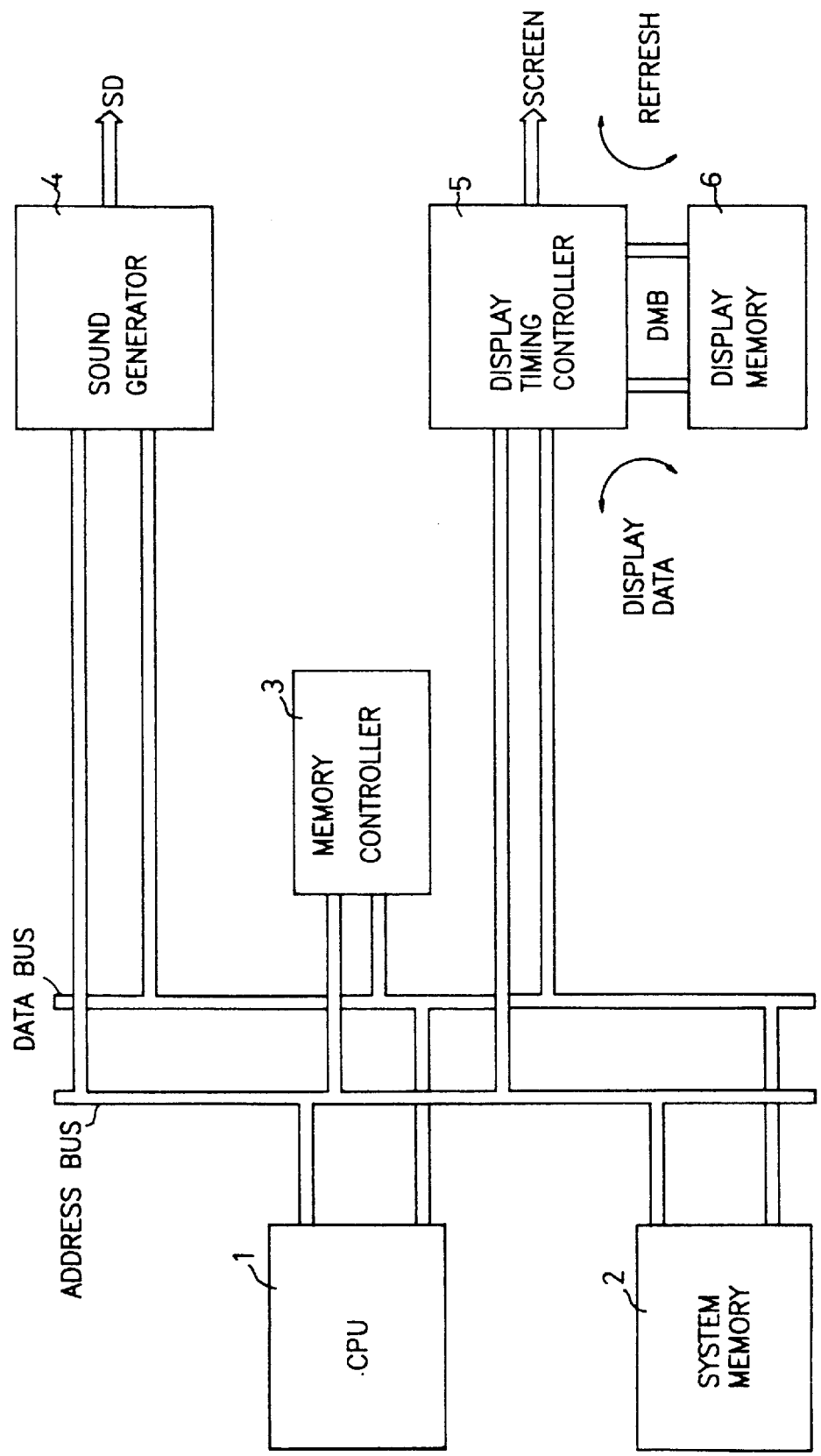
FIG. 1 is a block diagram of a conventional sound generation and display control apparatus for a personal digital assistant.
Figure 2:
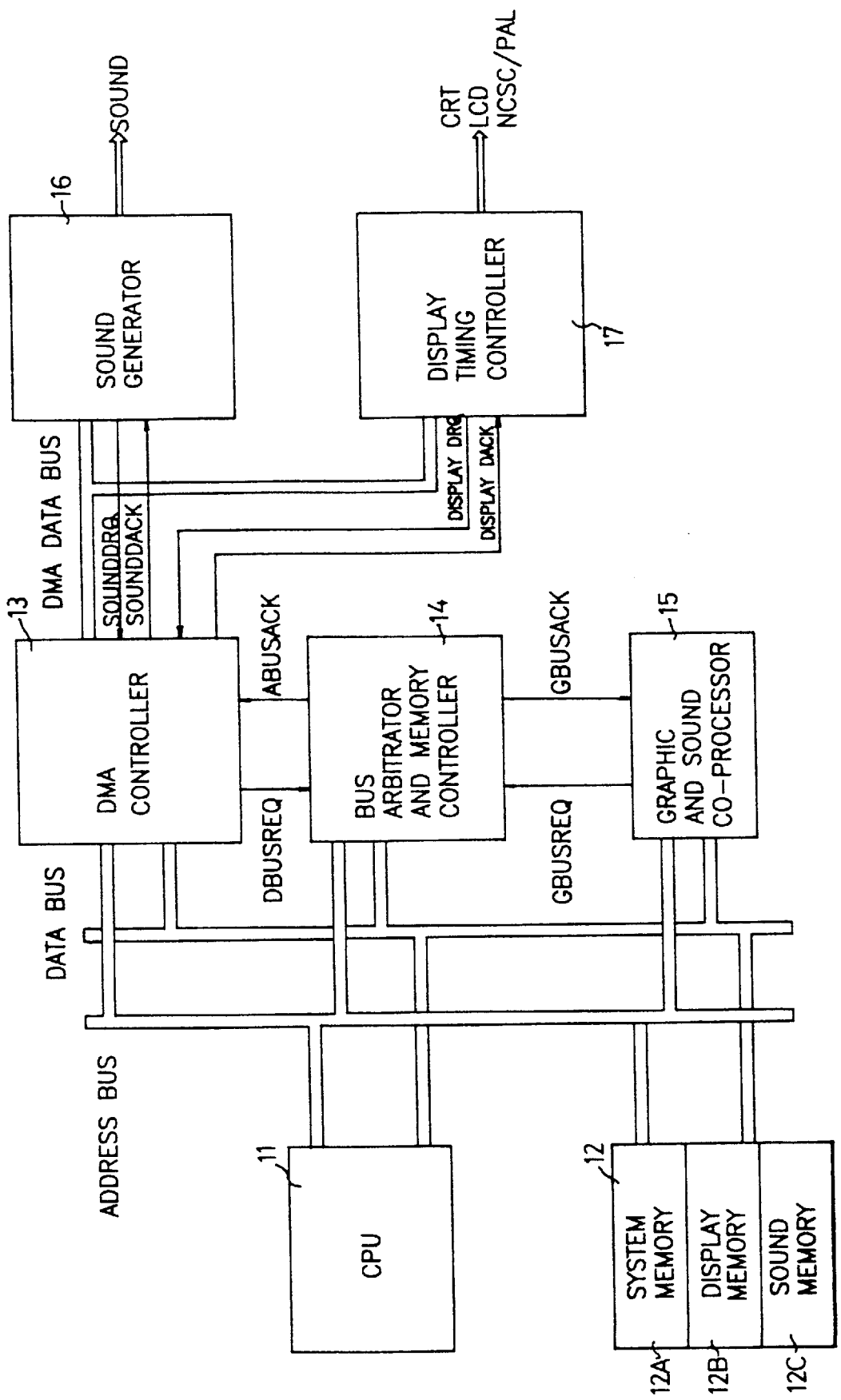
FIG. 2 is a block diagram of a sound generation and digital control apparatus for a personal digital assistant according to a first embodiment of the present invention.

Referring to FIG. 2, the construction of a sound generation and control apparatus for a personal digital assistant according to a first embodiment of the present invention will now be explained.

To begin with, as shown in FIG. 2, the sound generation and control apparatus for a personal digital assistant includes a central processing unit 11 for controlling the entire system so as to display data and to generate a specific sound, a memory 12 for storing system data, display data, and sound data, a DMA (Direct Memory Access) controller 13 for controlling access to the data stored in the memory 12, a bus arbitrator and memory controller 14 for arbitrating the allocations of the system bus and for controlling the access to and refreshment of the memory 12, a graphic and sound co-processor 15 for processing the sound and graphic data under control of the central processing unit 11, and a display timing controller 17 for receiving the graphic data from the DMA controller 13 and processing the data so as to display on a display member (not shown), such as a CRT, an LCD, and the like.

Here, the memory 12 includes a system memory 12A in which the system data are stored, a display memory 12B in which the display data to be displayed on the display member are stored, and a sound memory 12C in which the sound data processed by the sound generator 16 are stored.

Figure 3:
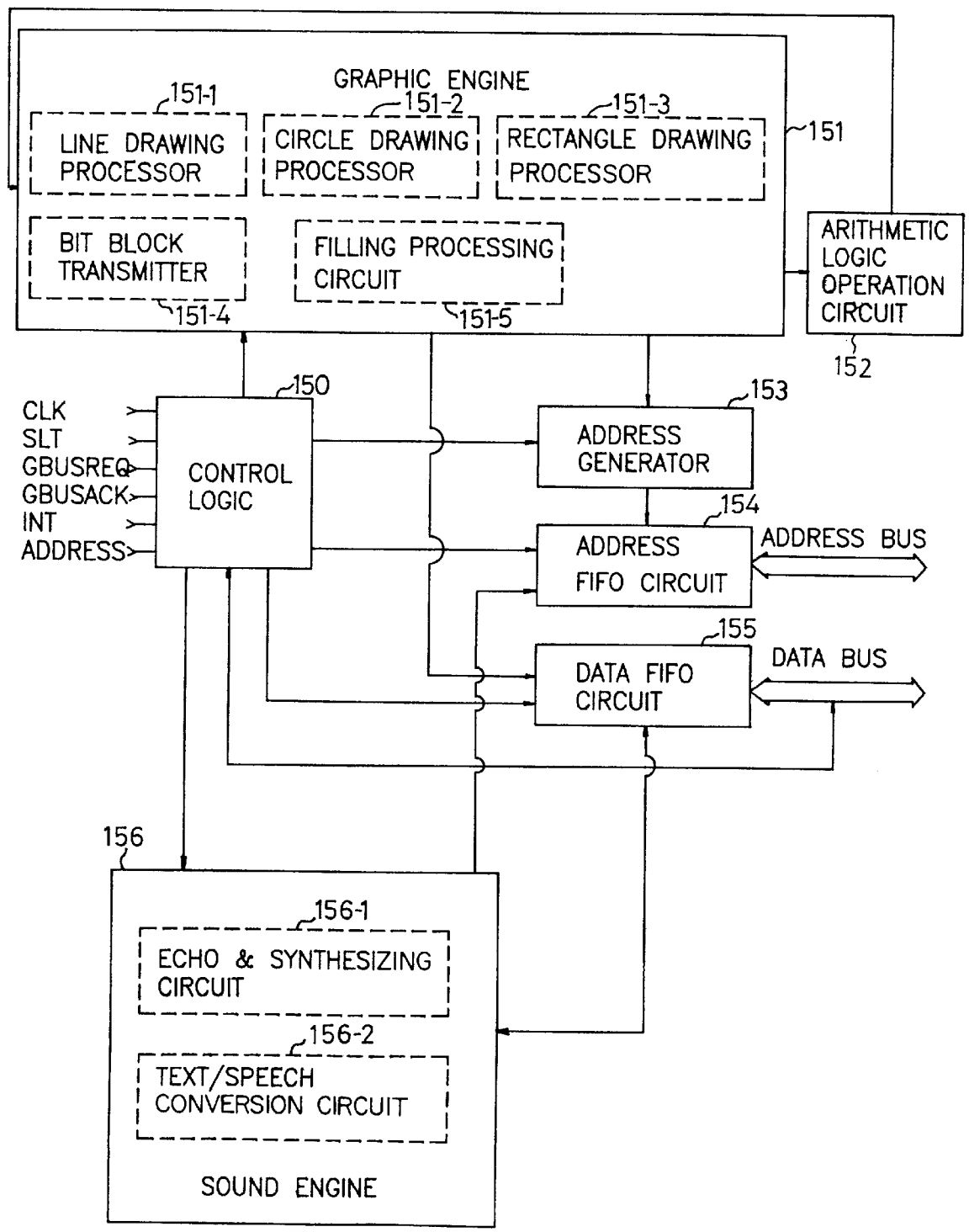
FIG. 3 is a block diagram of a graphic and sound co-processor of FIG. 2 according to the present invention.

The graphic and sound co-processor 15, as shown in FIG. 3, includes a control logic 150 for interfacing between the central processing unit 11 and the bus arbitrator and memory controller 14 and for controlling an internal module, a graphic engine 151 for generating graphic data in accordance with a control of the control logic 150, an arithmetic logic operation unit 152 for executing an operation needed to generate the graphic data, an address generator 153 for generating an address for an apparatus which displays the graphic data under control of the control logic 150 and the graphic engine 151, an address FIFO(First In First Out) circuit 154 for storing the address outputted from the address generator 153 in a FIFO form in accordance with a control of the control logic 150, a sound engine 156 for generating sound data in accordance with a control of the control logic 150 and for outputting to the address FIFO circuit 154 the address of the apparatus which outputs a sound corresponding to the sound data, and a data FIFO circuit 155 for storing the graphic data and the sound data in a FIFO form in accordance with a control of the control logic 150.

In addition, the graphic engine 151 includes a line drawing processor 151-1, a circle drawing processor 151-2, a rectangle drawing processor 151-3, a bit block transmitter 151-4, and a filling processing circuit 151-5, the sound engine 156 includes an echo and synthesizing circuit 156-1, and a text/speech conversion circuit 156-2.

The operation of the sound generation and display control apparatus for a personal digital assistant according to the first embodiment of the present invention will now be explained with reference to FIG. 2.

To begin with, the central processing unit 11 generally accesses the system memory 12A, the display memory 12B, and the sound memory 12C so as to process sound data and display data effectively, so that the performance of the entire system is enhanced.

The central processing unit 11 includes the graphic and sound co-processor 15 so as to enable a graphic and sound data processing. Here, the graphic and sound co-processor 15 is necessary for data processing, such as transmission of the bit blocks, graphic drawings, and sound effects such as an echo effect. That is, when the central processing unit 11 applies a clock signal CLK, an address signal ADDRESS, and a selection signal SLT to the control logic 150, the graphic engine 151 executes a line drawing, a circle drawing, a rectangle drawing, a bit block transmission, and a filling process in accordance with a control of the control logic 150. Thereafter, the graphic engine 151 generates and outputs the graphic data to the data FIFO circuit 155, and the address generator 153 generates an address of an apparatus on which the graphic data are to be displayed and outputs this address to the address FIFO circuit 154. In addition, the sound engine 156 generates an echo, mixes a sound, converts a text into a speech, outputs a corresponding data to the data FIFO circuit 155, and outputs the address corresponding to the sound data to the address FIFO circuit 154.

Thereafter, the control logic 150 outputs a data bus request signal GBUSREQ to the bus arbitrator and memory controller 14, and the bus arbitrator and memory controller 14 applies a recognition signal GBUSACK to the control logic 150. The signal GBUSACK corresponds to a data bus to be allocated to the graphic and sound co-processor 15. Thereafter, the control logic 150 applies an interruption signal INT to the central processing unit 11, and stores an address corresponding to the graphic and sound data to the display memory 12B and the sound memory 12C.

When the DMA controller 13 receives a DMA request signal SOUNDDRQ from the sound generator 16 and a DMA request signal DISPLAYDRQ from the display timing controller 17, the DMA controller 13 outputs a data bus request signal DBUSREQ to the bus arbitrator and memory controller 14, and the bus arbitrator and memory controller 14 outputs a recognition signal ABUSACK to the DMA controller 13, informing an application of the data bus to the DMA controller 13. Thereafter, the DMA controller 13 outputs the recognition signals SOUNDDACK and DISPLAYDACK to the sound generator 16 and the display timing controller 17, respectively, and outputs the data stored in the sound memory 12C and data stored in the display memory 12B to the sound generator 16 and the display timing controller 17, respectively.

Here, the DMA controller 13 includes a logic for arbitrating a DMA request of the sound generator 16 and the display timing controller 17. At this time, the DMA request signal DISPLAYDRQ has the priority with respect to the DMA request signal SOUNDDRQ. In addition, the bus arbitrator and memory controller 14 has functions of arbitrating the allocation of the data bus and refreshing the memory 12 in case that the memory 12 is a DRAM, and of controlling the memory accesses of the central processing unit 11, the DMA controller 13, and the graphic and sound co-processor 15.

The sound generator 16 receives the sound data outputted from the sound memory 12C through the DMA data bus and generates a sound corresponding to the sound data, and the display timing controller 17 receives the display data outputted from the display memory 12B through the DMA data bus and formats the data for a display member such as an LCD, a CRT, a television set of an NTSC/PAL and the like.

Figure 4:
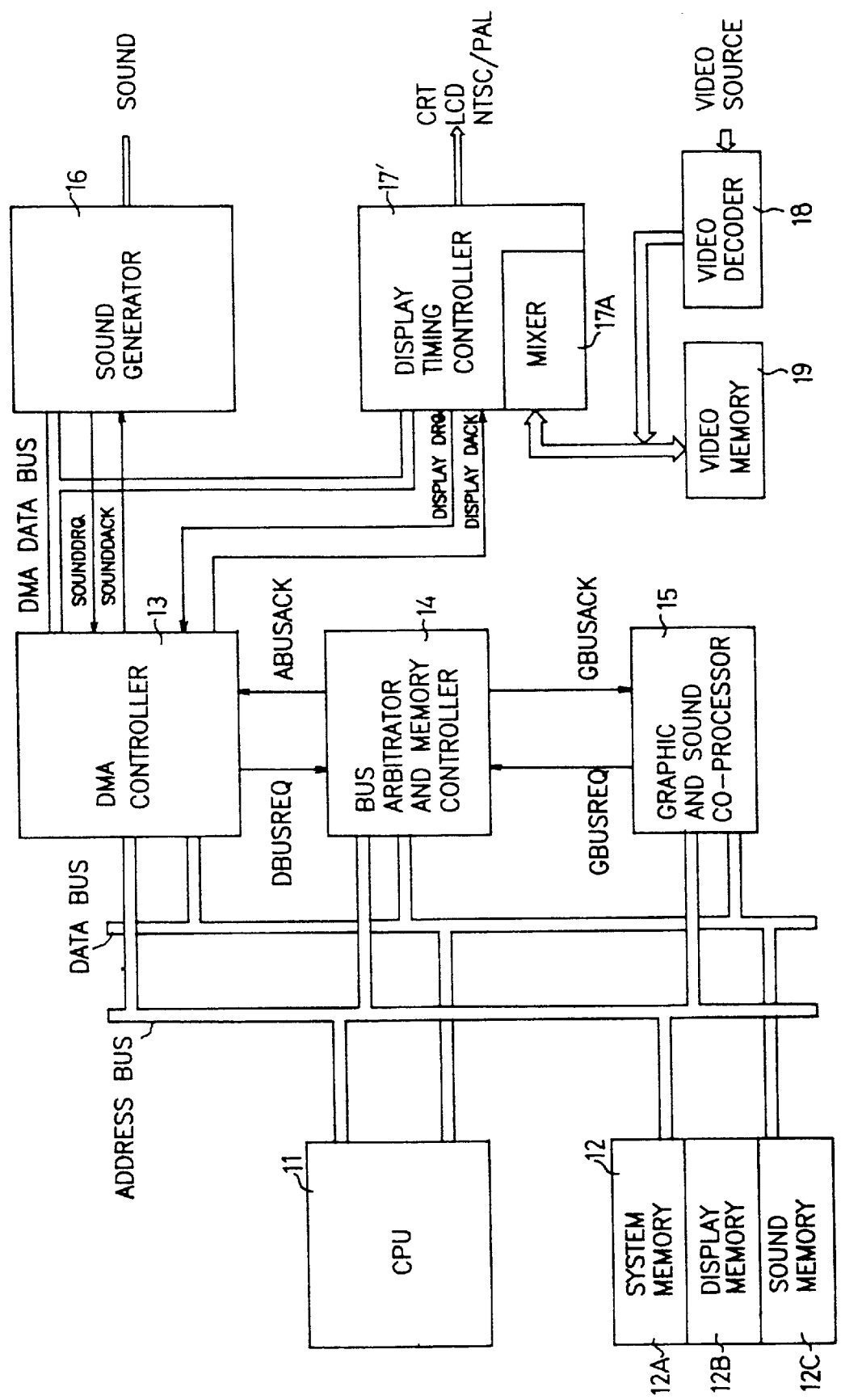
FIG. 4 is a block diagram of a sound generation and digital control apparatus for a personal digital assistant according to a second embodiment of the present invention.

Referring to FIG. 4, the second embodiment of the present invention includes the same elements as in the first functioning in the same manner, except a video decoder 18 for decoding an externally applied video source, a video memory 19 for storing the output data of the video decoder 18, and a mixer 17A for mixing the output data of the video memory 19 and the output data outputted from the display memory 12B are additionally provided.

Here, the mixer 17A is provided in the interior of the display timing controller 17'.

The operation of the second embodiment according to the present invention will now be explained with reference to FIG. 4.

The video decoder 19 decodes an externally applied video source into a data format suitable for the display timing controller 17'and stores the decoded data in the video memory 19.

In addition, the mixer 17A provided in the display timing controller 17'mixes the data outputted from the video memory 19 and the data outputted from the display memory 12B, and outputs the data to a display element such as a CRT or an LCD, so that a video overlay function can be achieved. In addition, the data stored in the video memory 19 are stored in the display memory 12B in accordance with a control of the DMA controller 13, and the stored video source can be edited in accordance with a control of the central processing unit 11 so that the externally video sources can be edited and displayed to establish a multimedia.

As described above, a sound generation and display control apparatus for a personal digital assistant according to the embodiments of the present invention is capable of improving the performances of the system by providing a graphic and sound co-processor and increasing the data transmission speed between the memory, the sound generator, and the DMA controller by controlling the access of the memory using a DMA controller. In addition, the present invention includes a certain member for processing an externally applied video data to provide a video overlay function, editing an externally applied video data, providing a single memory system, enhancing the system operation performance by removing a certain logic for a memory control, and reducing a space and power consumption. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sound generation and display control apparatus for a personal digital assistant, comprising:

a central processing unit for controlling operations of a system;

a graphic and sound co-processor for processing graphic and sound data in accordance with a control of said central processing unit;

a memory for storing the graphic and sound data processed by said graphic and sound co-processor and for storing system data;

a direct memory access (DMA) controller for accessing the graphic data, the sound data and the system data stored in said memory;

a bus arbitrator and memory controller for arbitrating an allocation of a system bus and for controlling an access to the memory;

a sound generator for receiving the sound data outputted from the memory through said DMA controller and for generating a sound corresponding to the sound data; and a display timing controller for receiving display data from the memory through the DMA controller and for processing the display data so as to display the display data on a display unit, wherein said graphic and sound co-processor includes,
a graphic engine for generating the graphic data;
an arithmetic logic operator for executing an operation so as to generate the graphic data; and
a sound engine for generating the sound data, and
wherein the display timing controller overlays the graphic data of the memory and video data externally input thereto.

2. The apparatus of claim 1, wherein said graphic and sound co-processor further includes:

a control logic for interfacing between the central processing unit and the bus arbitrator and memory controller, and for controlling the graphic engine, the arithmetic logic operator, and the sound engine;

an address generator for generating an address of an apparatus on which the graphic data are to be displayed in accordance with the control logic and said graphic engine; and an address circuit for storing and outputting the address generated from said address generator in accordance with a control of the control logic.

3. The apparatus of claim 2, wherein said sound engine outputs an address corresponding to the sound data to said address circuit.

4. The apparatus of claim 2, wherein said graphic and sound co-processor further includes:

a data circuit for storing the graphic and sound data in a predetermined form under control of the control logic.

5. The apparatus of claim 4, wherein the predetermined form is a FIFO (first-in-first-out) form.

6. The apparatus of claim 1, wherein said memory includes a system memory for storing the system data, and a display memory for storing the graphic data processed by the graphic and sound co-processor.

7. The apparatus of claim 1, wherein said display unit is one of a liquid crystal display (LCD), a cathode ray tube (CRT), and a television set of an NTSC/PAL.

8. The apparatus of claim 1, further comprising:

a video decoder for decoding the externally applied video data; and a video memory for storing data decoded by said video decoder.

9. The apparatus of claim 8, wherein the display timing controller includes a mixer for mixing the graphic data of the memory and the data of the video memory.

10. The apparatus of claim 1, wherein said graphic engine includes at least one of a line drawing processor, a circle drawing processor, and a rectangle drawing processor.

11. The apparatus of claim 10, wherein said sound engine includes an echo and synthesizing circuit and a text/speech converting circuit.

12. A sound generation and display control apparatus for a personal digital assistant, comprising:

a central processing unit for controlling operations of a system;

a graphic co-processor for processing graphic data in accordance with a control of said central processing unit;

a memory for storing the graphic data processed by said graphic co-processor and storing system data;

a bus arbitrator and memory controller for arbitrating an allocation of a system bus and for controlling an access to the memory;

a video decoder for decoding an externally applied video source into a format suitable for a display unit;

a video memory for storing data decoded by said video decoder;

a display timing controller for processing the graphic data of said memory through a system bus and for overlaying the graphic data of the memory and the data outputted from said video memory and for displaying the overlayed data on said display unit; and a direct memory access (DMA) controller for accessing the graphic data stored in the memory under control of said display timing controller.

13. The apparatus of claim 12, wherein said display timing controller includes a mixer for mixing the data outputted from the video memory and the graphic data of the memory.

14. The apparatus of claim 12, wherein the direct memory access controller transmits the graphic data to said display timing controller, and stores the data of the video memory in the memory.

15. The apparatus of claim 12, wherein the display unit is one of a liquid crystal display, a cathode ray tube, and an NTSC/PAL television set.

16. The apparatus of claim 15, wherein said graphic co-processor includes means for processing sound data under control of said central processing unit.

17. The apparatus of claim 16, wherein said graphic co-processor includes a graphic engine for generating the graphic data, and a sound engine for generating the sound data.

18. The apparatus of claim 17, wherein said graphic engine includes at least one of a line drawing processor, a circle drawing processor, and a rectangle drawing processor.

19. The apparatus of claim 17, wherein said sound engine includes an echo and synthesizing circuit and a text/speech converting circuit.

* * * * *